United States Patent
Farrugia et al.

(10) Patent No.: US 8,553,878 B2
(45) Date of Patent: Oct. 8, 2013

(54) DATA TRANSFORMATION SYSTEM USING CYCLIC GROUPS

(75) Inventors: Augustin J. Farrugia, Cupertino, CA (US); Mathieu Ciet, Paris (FR); Benoit Chevallier-Mames, Paris (FR)

(73) Assignee: Apple Inc., Cupertino, CA (US)

( * ) Notice: Subject to any disclaimer, the term of this patent is extended or adjusted under 35 U.S.C. 154(b) by 594 days.

(21) Appl. No.: 12/760,474

(22) Filed: Apr. 14, 2010

(65) Prior Publication Data
US 2011/0255687 A1    Oct. 20, 2011

(51) Int. Cl.
*H04K 1/00* (2006.01)
*H04L 9/00* (2006.01)
*H04L 9/24* (2006.01)

(52) U.S. Cl.
USPC ............ 380/28; 380/29; 380/44; 380/45; 380/46; 380/286

(58) Field of Classification Search
USPC .................. 380/28–30, 44–47, 286
See application file for complete search history.

(56) References Cited

U.S. PATENT DOCUMENTS

| | | | |
|---|---|---|---|
| 5,799,088 A * | 8/1998 | Raike | 380/30 |
| 6,618,483 B1 * | 9/2003 | Vanstone et al. | 380/30 |
| 2006/0098819 A1 * | 5/2006 | Zeng et al. | 380/44 |
| 2009/0034739 A1 * | 2/2009 | Teranishi et al. | 380/278 |
| 2010/0208895 A1 * | 8/2010 | Boneh et al. | 380/278 |

OTHER PUBLICATIONS

Handbook of Applied Cryptography, Menezes, CRC Press, Inc., 1997, pp. 294-296.*

* cited by examiner

*Primary Examiner* — Jeffrey Pwu
*Assistant Examiner* — Jayesh Jhaveri
(74) *Attorney, Agent, or Firm* — Adeli & Tollen LLP

(57) ABSTRACT

An asymmetric (dual key) data obfuscation process, based on the well known ElGamal cryptosystem algorithm, and which uses multiplicative cyclic groups to transform (obfuscate) digital data for security purposes. In the present system the data need not be a member of the cyclic group, unlike in the ElGamal cryptosystem algorithm. Also, any one of several additional mathematical data transformations are further applied to the transformed data, thereby enhancing security of the transformed data.

23 Claims, 3 Drawing Sheets

DATA TRANSFORMATION SYSTEM USING CYCLIC GROUPS

FIELD OF THE INVENTION

This disclosure relates to data security, cryptography, obfuscation, and specifically obfuscation (transformation) of data using mathematical cyclic groups.

BACKGROUND

In the field of computer software, security is important. Well known technical measures for protecting the security of software and computer data include what is referred to in the field as "software obfuscation" which protects software from unauthorized use or access by making the software code more obscure than it is in its original form, thus making it harder for a potential attacker to understand it or access it or its contents during execution. In general obfuscation is intended to make it more time consuming to reverse engineer a program, typically to protect the program against hackers or attackers who wish to determine what the software is doing or to alter it or gain unauthorized access. One aspect of software is handling of data and hence obfuscating the data is also important.

It is known to obfuscate arrays of data which are being manipulated by computer software, see "Obfuscate Arrays by Homomorphic Functions" by William Zhu et al., IEEE, 2006, which discloses several methods of software obfuscation using data transformation for stored arrays. The data transformations described there include array index changes, array folding and array flattening. Array index changing involves changing the data array index. Array folding and flattening include change the dimension of an array in the software code.

New methods of obfuscation are of great interest in the software field and especially methods of obfuscating or protecting data which is being processed in a non-secure environment such as a consumer electronics device or personal computer. This especially occurs in the context of content protection software, which protects digital content such as audio and video material from misuse. Typically at least a portion of this software is executed in a client device such as a mobile telephone, laptop computer, video player, etc. where the device itself is accessible to hackers, as are some of its internal operations.

SUMMARY

Cryptographic algorithms are widely used for encryption of digital data such as messages, video, audio, etc. Such algorithms are typically computer enabled and carried out by computer software (code) or logical circuitry. The "ElGamal" cryptosystem is a well known asymmetric (public key) cryptographic algorithm named after Taher ElGamal. In such systems encryption requires knowledge only of the public key. Only someone having the mathematically related private (secret key) can decrypt an encrypted message. The public key is the result of a one-way mathematical function applied to the private key. ElGamal also uses the mathematical concept of cyclic groups and has three main elements—a key generator, the encryption algorithm, and the decryption algorithm, described in detail below.

The present data transformation (obfuscation) methods and system, like the ElGamal cryptosystem algorithm, employ an asymmetric algorithm where obfuscation uses the first (public) key and de-obfuscation uses the second (private) key, and like the ElGamal cryptosystem is based on the concept of multiplicative cyclic groups. However, certain deficiencies in the ElGamal cryptosystem algorithm are overcome here by adding one or more of a variety of data transformations to an ElGamal-like algorithm. Such transformations include adding an additional cyclic group operation, multiplying by a constant, dynamically branching, and multiplying the transformed data, all of which also generally add complexity. Further the present data transformation system, unlike in the ElGamal cryptosystem algorithm where the plaintext message must be a member of the group, places no limit on message (input value) content or length, except its size. The present obfuscation processes also do not require the same level of security as encryption or signature schemes. Finally, performance is also of importance in accordance with the present processes.

The goal of transforming data is to operate directly on the transformed data while trying to avoid exposing the elements used for this transformation or the unmasked data. It can also be of particular interest to be able to process switching between transformations. This is done also without exposing the elements used for the transformation or the unmasked data.

DETAILED DESCRIPTION

Figure 1:
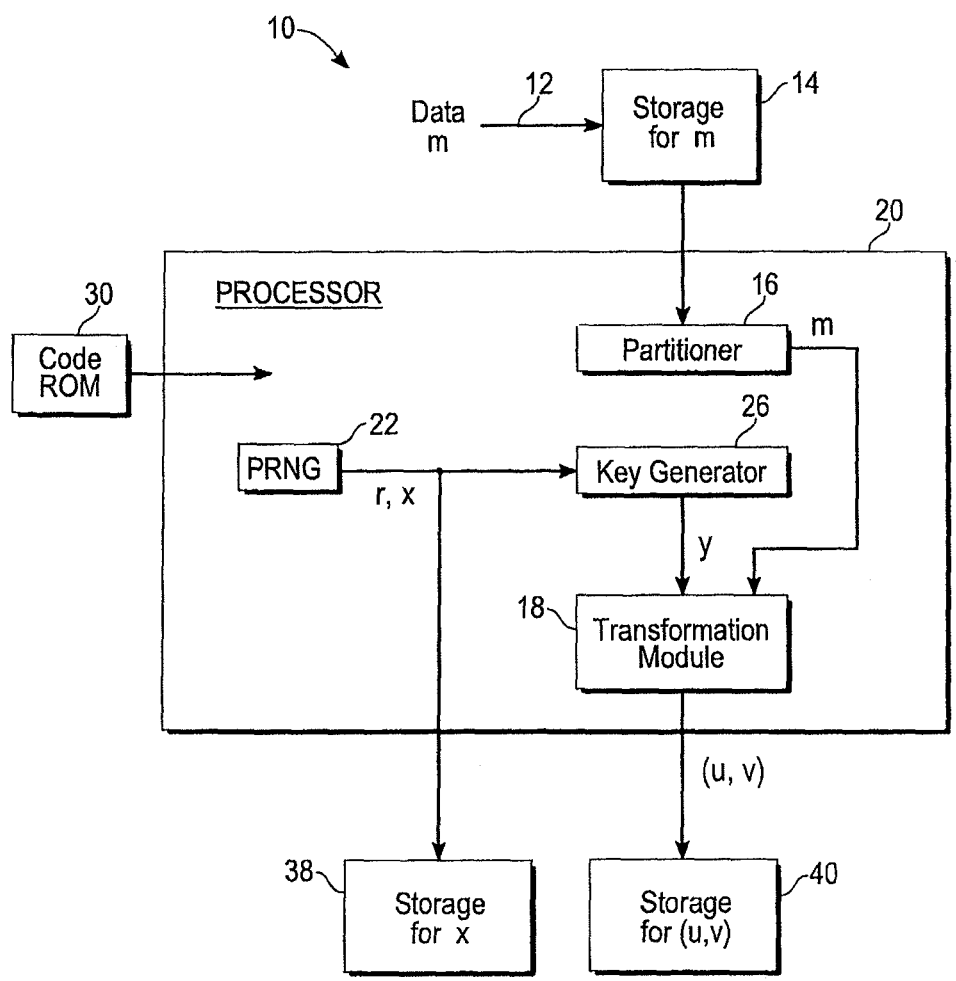
FIG. 1 shows a data transformation in a block diagram in accordance with the invention.

The present data transformation methods are based upon concepts used in the ElGamal cryptosystem, which is usually embodied in computer software and operates as follows expressed algebraically (as is conventional in the field):

Parameters: Take a large multiplicative cyclic group, designated here G, of a prime order designated q, and take a generator element number of a large subgroup of group, designated g, which is a member of group G. Suppose group G is written multiplicatively. Cyclic groups are well known in mathematics. In a multiplicative cyclic group, each element of the group generated by g is a number which is a power of the element g. In cyclic groups, every subgroup of a particular group is also cyclic.

Key Generation: Pick a random number, designated x, in the range $\{0,q-1\}$. The private (secret) key for decryption is then x, while the public key (for encryption and which conventionally may be published in the encryption context) is designated $y=g\hat{\ }x$ where the operator "^" indicates "to the power of" (and is used in this disclosure because it is the notation used in some computer software languages.). The operation is carried out in the group. The public key also contains G, q and g.

Encryption: To encrypt a message (in the form of digital data), designated M where M is an element (member) of group G, one selects a random number, designated r, in the range $\{0,q-1\}$, and then computes:

$$u = g\hat{\ }r, \text{ and}$$

$$v = y\hat{\ }r * M$$

All operations are done in the group.

The cipher text, designated c for message M, is then (u,v) which is the concatenation of u and v.

Decryption: To decrypt c=(u,v), one simply recovers message m by computing (where decryption requires knowing the private key x):

$$M = v * u\hat{}(-x)$$

Some features of the ElGamal cryptosystem are not very practical even though the actual computations are routine. Notably, the fact that the plaintext message M itself must be a member of the cyclic group G. So, in accordance with the present method to obfuscate data (not encrypt/decrypt) some concessions are made in security to increase usefulness such as the ability to transform (obscure) arbitrary length bit strings (messages or data).

The following examples in accordance with the invention describe the present data transformations for digital (binary) data (a "message") arranged as an example in 32-bit or 64-bit long data words. Of course, this could be readily modified for longer or shorter words. This means group G is the set of 32-bit long words. The present process typically operates on a data word (or other portion of data) at a time.

The message (data) is associated with a private (secret) key also designated here (as above) x (which is the equivalent of the mask in other types of data obfuscation). All arithmetic operations in this example are done modulo $2\hat{}32$ due to the word length (32 bits). Element g is common to all data and is odd, and of maximal order (that is to say, order $2\hat{}30$ here). For example, g=3 is of order $2\hat{}30$ modulo $2\hat{}32$. Element g may also be kept secure since in accordance with the present method there are very few operations which require value g to appear in clear in the software code in which the present system is typically embodied. In accordance with this method, there need be no distinction between public and private keys—both can be kept secret.

The following discloses various embodiments of the invention. Each is described here for ease of understanding in terms of the above described ElGamal cryptosystem algorithm, but more generally each is a keyed data transformation using cyclic groups. Note that the arithmetic operations are done, e.g., modulo $2^{32}$.

(a) Clear to Transformed Data i.e., one transforms a clear value (message or data) designated m into an obfuscated (transformed) value designated (u,v) by a process expressed as, using the above ElGamal algorithm notation:

$$u = g\hat{}r$$

$$v = y\hat{}r * m$$

where r={0,q-1}, and all operations are done modulo $2^{32}$.

For a random number r selected at the software code compilation time where as above g is the generator value and y=g^x. Key handling here typically would differ from that in a public key-private key cryptosystem since here both keys are typically secret (private).

It is to be understood that these embodiments are described here as being carried out conventionally in computer code also referred to as software which conventionally is originally written in source code form in a particular computer language such as C or C++ and then compiled by a computer software compiler for that language into what is referred to as object or binary code. The object code is then actually executed on a computer processor at what is referred to as run time or execution. Note that the obfuscated message value (u,v) is two data words long, while the clear value m takes one word, so the expansion factor is 2 as in the ElGamal cryptosystem. (This assumes the processing here is word-by-word, which is not limiting.)

FIG. 1 shows in a block diagram an apparatus 10 to carry out this process. Clear data m is received at input port 12 which is coupled to a first computer readable medium (memory such as RAM, e.g. a buffer) 14 where the data m is stored. The stored data m is then supplied to a partitioner element 16 in processor 20 where it is partitioned into words or similar portions. Each word is then coupled to an input port of the transformation module 18. Also provided is a pseudo-random number generator 22 which generates numbers r and x and supplies same to the key generator module 26, which calculates the public key y as explained above and supplies it to the transformation module 18 which calculates as explained above the transformed data (u,v). Also present is a ROM memory 30 which stores the code executed by processor 20 and second and third computer readable media (memory such as RAM) 38 and 40 which respectively store the secret key x and (u.v). Note that any further modifications to the data transformation process, as explained below, are also performed by the transformation module 18.

(b) Transformed data to clear. This process recovers the clear (original) value m from the transformed value (u,v) by computing, again using the above notation and using the "private" (secret) value x:

$$m = v * u\hat{}(-x).$$

Figure 2:
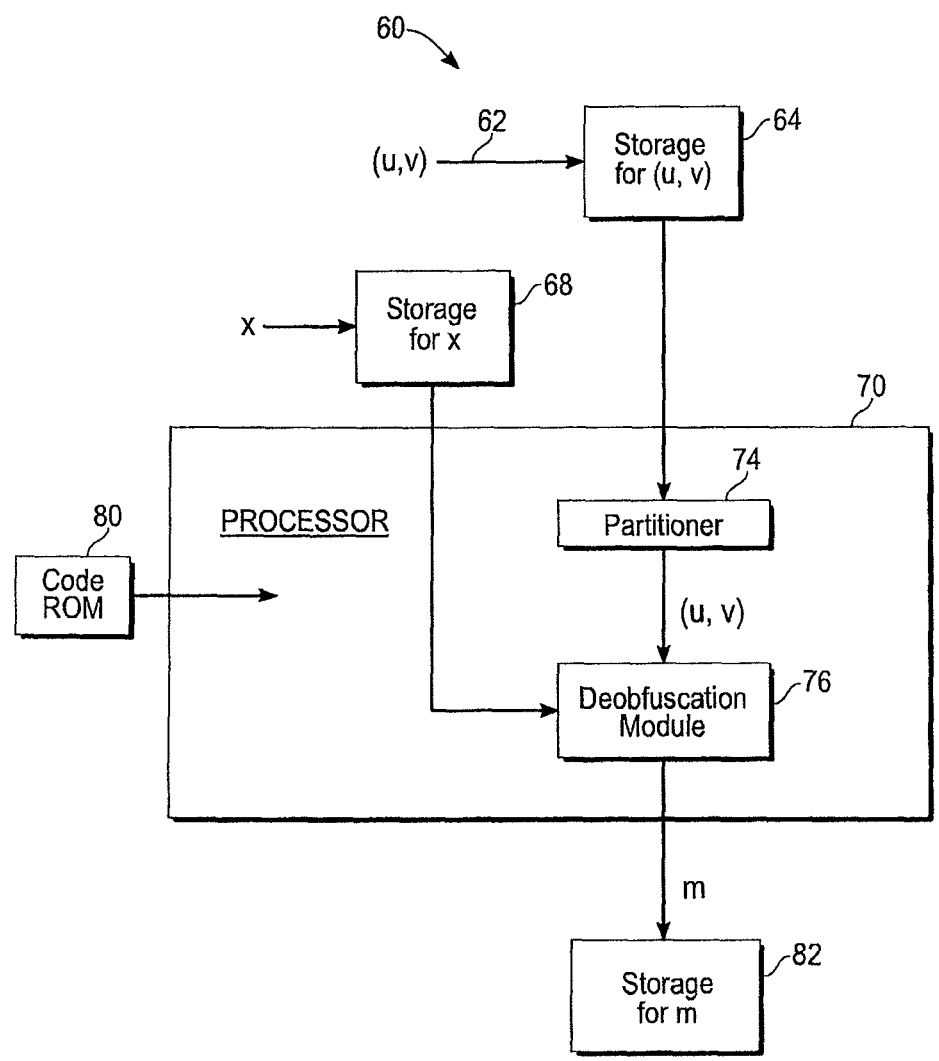
FIG. 2 shows recovery of transformed data in a block diagram in accordance with the invention.

FIG. 2 shows in a block diagram an apparatus 60 to carry out this obfuscation process (a) above; note that in a typical situation the same hardware (circuitry) is used to carry out both the obfuscation (process (a)) and de-obfuscation (process (b)), using different software modules. In FIG. 2 the obfuscated data (u,v) is supplied at input port 62 where it is stored in computer readable medium (memory such as RAM) 64, and then supplied at an input port of processor 70 to a partitioner module 74 which partitions (u,v) into words. Also provided conventionally is the needed private key x, from its storage 68; both x and each word of (u,v) are coupled to the input ports of the Deobfuscation Module 76 which as explained above calculates and outputs the clear (recovered) message m which is then stored in a computer readable medium 82. Again, any modifications to the deobfuscation process as explained below are performed in module 76. The software needed by processor 70 is supplied from code storage 80 which may be ROM.

(c) Transformed data to transformed data. One can transform a transformed value into another transformed value, which corresponds to the same original clear value. This is a good property to add complexity against an attacker, and operates as follows.

(c.1) This method includes selecting a second (fresh) random number r at software compilation time, and transforming the initially transformed value (u,v) into the additionally transformed value (u',v') where:

$$u' = u * g\hat{}r, \text{ and}$$

$$v' = v * y\hat{}r$$

where g^r and y^r are computed and stored during the software compilation time.

(c.2) Another method is to perform the data transformation, during the code execution time, of the message by selecting during the code execution time a second (fresh) random number r, and transforming (u,v) into (u',v') where:

$$u' = u * g\hat{}r, \text{ and}$$

$$v' = v * y\hat{}r$$

where g^r and y^r are computed during the code execution time.

(d) Multiplying a transformed value with a constant. To multiply (modulo 2^32) a transformed value by a constant number designated a (not to be confused with process (a) above), one transforms (u,v) into (u',v') where:

$$u'=u*g^r, \text{ and}$$

$$v'=v*(y^r*a)$$

where g^r and (y^r*a) are computed during the code compilation time and again r is a fresh value. In this case, the constant value a does not appear in clear in the object code software, which enhances security.

Note by using the above processes (c.1) and (d), it is possible to provide an operation which is either a single copy (copied from one location to another) or a multiplication, while an attacker is not able to distinguish which is the case (processes (c.1) or (d)), thereby also enhancing security.

(e) Add a value to transformed data, as follows. The goal is to add a value b to the message in its obfuscated form (u,v) while allowing recovery later of the clear message.

(e.1) In this embodiment one adds a constant number designated b (again, not to be confused with process (b) above) to a transformed value of message m by a method having the following steps:
1. select a multiplicative odd constant value a in the compilation time. This constant "a" is odd because it must be invertible mod $2^{32}$.
2. apply process (d) above to transform (u,v) which is the obfuscated form of m, into an obfuscated form of a*m.
3. apply process (b) above to recover a*m.
4. increment a*m by the number computed as a*b (as is computed during compilation time).
5. apply process (a) above to transform a*(m+b), which gives (u,v).
6. remove constant value a, by multiplying v by the number a^(−1). Note that a is invertible, since it was chosen to be odd in step 1 of this process.

This method is rather complex but relatively secure (i.e., it hides both the message data m and the mask values a and b).

(e.2) Another embodiment using adding a mask is applied on a case-by-case basis as follows, if at a moment in execution of the object code, one knows the random number r such that (u,v)(=g^r, y^r*m). This is notably the case if:
1. only the above processes (a) and (b) were used, or
2. only the above processes (a), (b) and (c.1) and (d) were used, and the execution path to reach a particular instruction of the code is unique. (Unique here refers to there being only one path to pass control to the given instruction from a calling function.)

In other words, to apply process (e.2), one must compute the corresponding random number r (same as the first value of r) by referring to the current code location being executed, and the corresponding random number r must be unique, whatever branches or conditions, etc. are present in the code. In other words, one cannot have multiple r's for a given position in the code.

So in these cases if one knows the random number r so that (u,v)=(g^r, y^r m), one can simply increment m by constant value b (not process (b) above) by transforming (u,v) into (u',v') as follows:

$$u'=u, \text{ and}$$

$$v'=v+(y^r*b)$$

where (y^r*b) is computed during the code compilation time.

This can be made even more secure by selecting another (fresh) random number R and computing:

$$u'=u*g^R, \text{ and}$$

$$v'=v*y^R+(y^{(r+R)}*b)$$

where (g^R, y^R, and (y^(r+R)*b) are computed during the compilation time.

(f) In other embodiments, one multiplies two obfuscated values together without going back to either clear values, as follows in two different processes.

(f.1) It is possible to multiply together input values if they share the same private key x (and so they also share the same public key y). Indeed, if:

$$(u,v)=(g^r, y^r*m) \text{ and } (u',v')=(g^{r'}, y^{r'}*m')$$

where $m'=(u',v')$
then:
$m'=(u'',v'')=(u*u', v*v')$ is a transformed value of $m*m'$.

Note that the multiplication process (and the other arithmetic operations here) m*m' is to be understood as being a multiplication, e.g., modulo (mod) 2^32. (Other modulo values may be used here and in the other examples such as $2^8$, $2^{16}$, $2^{64}$, etc. depending on the type of data.)

(f.2) If one wants to multiply together values not having the same private key x, this is performed as follows:
suppose $$(u,v)=(g^r, y^r*m) \text{ has associated keys x and y}$$

and $$(u',v')=(g^{r'}, y'^{r'}*m') \text{ has associated keys } x' \text{ and } y'$$

then combine (u,v) and (u',v') as follows:
convert (u',v') to x and y by computing:

$$(u'',v'')=(u'^{(x'/x)}, v')$$

This can be expressed as:

$$(u', v') = (g^{\wedge}r', g^{\wedge}(x'r')*m')$$

so setting $r'' = x'r'/x \mod q$ $$\begin{aligned}(u'', v'') &= (u'^{\wedge}(x'/x), v')\\ &= (g^{\wedge}r'', g^{\wedge}(x'r')*m')\\ &= (g^{\wedge}r'', g^{\wedge}(xr'')*m')\\ &= (g^{\wedge}r'', y^{\wedge}r''*m')\end{aligned}$$

which is a correct transformed value of m' with associated keys x and y.

Apply process (f.1) above now on (u,v) and (u',v') to obtain the representation of the product.

Embodiments of the invention have advantages in terms of enhancing complexity (diversity) and so increasing security, such as re-randomization in process (c) above; combinations with addition and multiplication operations where data and masks are relatively well hidden in processes (d) and (e) above; and multiplication of transformed values together in process (f) above. Further, there is provided a high level of complexity to the present data transformations, which is greater than with an affine or Boolean or multiplicative data transformation. The present methods are alternatives and improvement on classical methods as Boolean and arithmetic transforms; these are well known techniques to obfuscate data in code. Further, embodiments of the invention are different from such affine or Boolean or multiplicative transforms so greater diversity is provided, hence more security. Further, there is a 1-to-n transformation here, i.e. a clear value can correspond to many different obfuscated values which enhances security. Further, one can change the masks during software execution (see process c.2 above) which provides a dynamic process which further enhances security. Further, much of the computation here is done during the software compilation, which speeds up the subsequent execution. One disadvantage is that in embodiments of the invention, the transformed data, being longer (as in the ElGamal encryption) than the clear data, requires more memory to store it than does the original data.

In addition to the computer enabled (software) obfuscation/deobfuscation processes disclosed here, also contemplated is (alternatively) a hardware (logic circuitry) apparatus dedicated to performing these processes, a computer readable storage medium such as a computer memory, disc drive, or CD storing computer code (a program) for carrying out the processes on a general purpose computer or computing device, and a computer or computing device programmed with this computer code as described above. Typical languages for software coding of the processes are the well known C and C++ languages. Writing such code would be routine in light of the above algebraic descriptions of embodiments of the invention.

Figure 3:
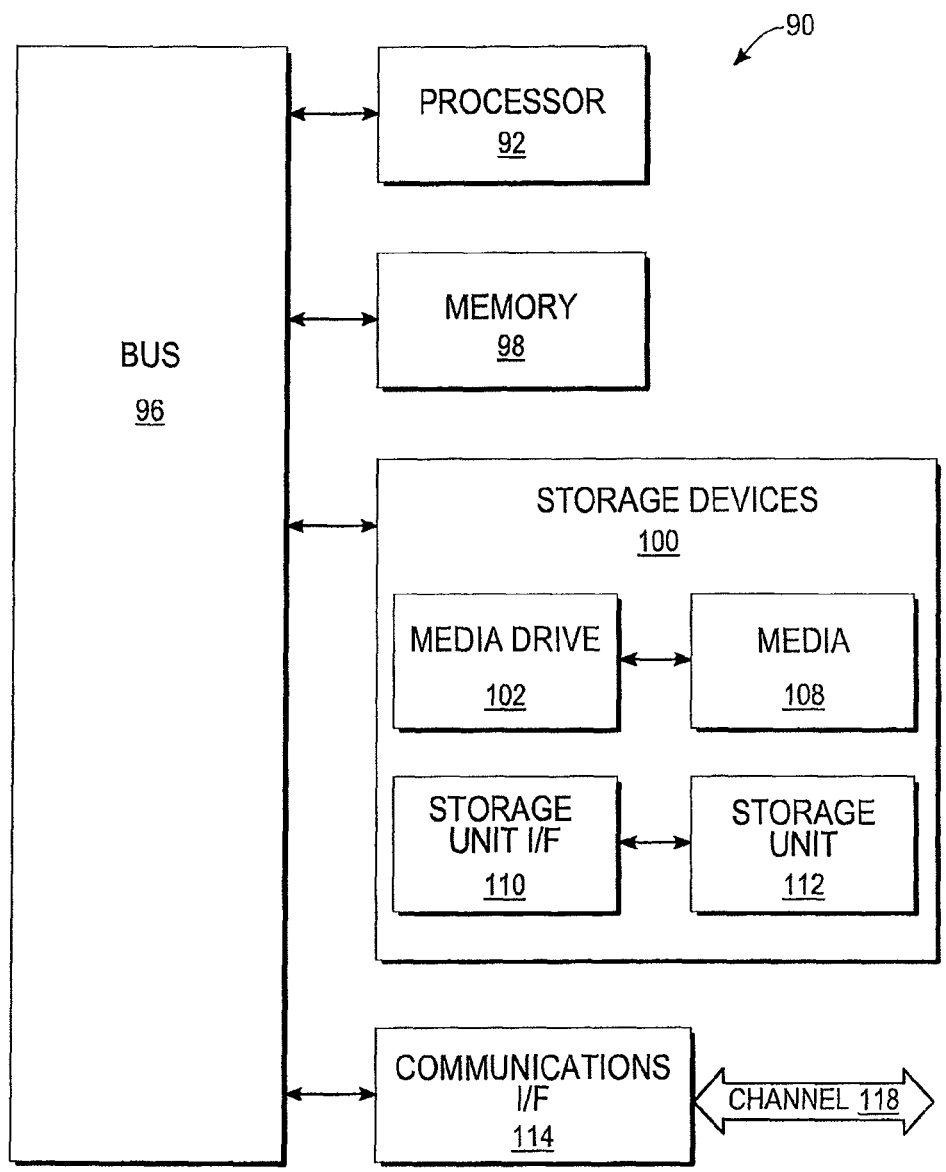
FIG. 3 shows in a block diagram details of a computing apparatus as in FIGS. 1 and 2.

FIG. 3 shows in a block diagram relevant portions of a computing device (system) 90 which is suitable to carry out obfuscation and/or deobfuscation or both in accordance with the invention. (Commonly both obfuscation and deobfuscation are carried out in the same device.) This is, e.g., a server platform, computer, mobile telephone, Smart Phone, personal digital assistant or similar device, or part of such a device and includes conventional hardware components executing in one embodiment software (computer code) as represented by the above pseudo-code example. This code may be, e.g., in the C or C++ computer language or its functionality may be expressed in the form of firmware or hardware logic; writing such code or designing such logic would be routine in light of the above description. Of course, the above examples are not limiting. Electric signals conventionally are carried between the various elements of FIG. 3.

FIG. 3 thus shows further detail of the FIGS. 1 and 2 computing devices in one embodiment. FIG. 3 illustrates a typical and conventional computing system 90 that may be employed to implement processing functionality in embodiments of the invention for encrypting and/or decrypting and shows additional detail of the FIGS. 1 and 2 systems. Computing systems of this type may be used in a computer server or user (client) computer or other computing device, for example. Those skilled in the relevant art will also recognize how to implement embodiments of the invention using other computer systems or architectures. Computing system 90 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system can include one or more processors, such as a processor 92 (equivalent to processors 20 and 70 in FIGS. 1 and 2). Processor 92 can be implemented using a general or special purpose processing engine such as, for example, a microprocessor, microcontroller or other control logic. In this example, processor 92 is connected to a bus 96 or other communications medium. Note that in some embodiments the present process is carried out in whole or in part by "hardware" (dedicated circuitry) which is equivalent to the above described software embodiments.

Computing system 90 can also include a main memory 98 such as random access memory (RAM) or other dynamic memory, for storing information and instructions to be executed by processor 92. Main memory 98 also may be used for storing temporary variables or other intermediate information during execution of instructions to be executed by processor 92. Computing system 90 may likewise include a read only memory (ROM) or other static storage device coupled to bus 96 for storing static information and instructions for processor 92.

Computing system 90 may also include information storage system 100, which may include, for example, a media drive 102 and a removable storage interface 110. The media drive 102 may include a drive or other mechanism to support fixed or removable storage media 108, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 108 may include, for example, a hard disk, floppy disk, magnetic tape, optical disk, CD or DVD, or other fixed or removable medium that is read by and written to by media drive 102. As these examples illustrate, the storage media 108 may include a computer-readable storage medium having stored therein particular computer software or data.

In alternative embodiments, information storage system 100 may include other similar components for allowing computer programs or other instructions or data to be loaded into computing system 90. Such components may include, for example, a removable storage unit 112 and an interface 110, such as a program cartridge and cartridge interface, a removable memory (for example, a flash memory or other removable memory module) and memory slot, and other removable storage units 112 and interfaces 110 that allow software and data to be transferred from the removable storage unit 112 to computing system 90.

Computing system 90 can also include a communications interface 1144 (equivalent to ports 12 and 62 in FIGS. 1 and 2). Communications interface 114 can be used to allow software and data to be transferred between computing system 90 and external devices. Examples of communications interface 84 can include a modem, a network interface (such as an Ethernet or other network interface card (NIC)), a communications port (such as for example, a USB port), a PCMCIA slot and card, etc. Software and data transferred via communications interface 114 are in the form of signals which can be electronic, electromagnetic, optical or other signals capable of being received by communications interface 114. These signals are provided to communications interface 84 via a channel 118. This channel 118 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 98, storage device 118, or storage unit 112. These and other forms of computer-readable media may store one or more instructions for use by processor 92, to cause the processor to perform specified operations. Such instructions, generally referred to as "computer program code" (which may be grouped in the form of computer programs or other groupings), when executed, enable the computing system 90 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 90 using, for example, removable storage drive 112, drive 102 or communications interface 114. The control logic (in this example, software instructions or computer program code), when executed by the processor 92, causes the processor 92 to perform the functions of embodiments of the invention as described herein.

This disclosure is illustrative and not limiting. Further modifications and improvements will be apparent to these skilled in the art in light of this disclosure and are intended to fall within the scope of the appended claims.

The invention claimed is:

1. A method of transforming data with a keyed cyclic group process that uses a particular group as inputs, the method comprising:
    receiving a set of data, wherein the set of data is not a member of the group of the keyed cyclic group process;
    partitioning the set of data into a plurality of data portions that are members of the group;
    for a particular data portion, applying the keyed cyclic group process by applying a function of a group member, a key, and a first random number to the particular data portion to produce a first transformed data;
    re-applying the keyed cyclic group process to the first transformed data using a second, different random number to obtain a second transformed data; and
    storing the resulting second transformed data in a computer readable storage medium as an encrypted portion of the set of data.

2. The method of claim 1, wherein the particular data portion is designated m, the key for the keyed cyclic group process is designated x, a generator element designated g is provided which is a member of the group, and the first random number is designated r, whereby the first transformed data is designated (u, v) and is calculated as $(u, v) = (g^r, g^{xr}*m)$.

3. The method of claim 2, wherein a second key is designated y, and calculated as $y = g^x$.

4. The method of claim 2, wherein the keyed cyclic group process further comprises multiplying a portion v of the first transformed data by a predetermined constant value designated a to obtain a further transformation of the data designated (u', v') and calculated as $(u', v') = (u*g^{r'}, v*(g^{xr'}*a))$, wherein r' is a newly generated random number.

5. The method of claim 2, wherein a predetermined value is added to the first transformed data.

6. The method of claim 1, wherein the keyed cyclic group process uses the ElGamal encryption algorithm.

7. The method of claim 1, wherein the keyed cyclic group process operates on 8, 16, 32 or 64 bits of data.

8. The method of claim 1, wherein the key is derived by a one way process from another key used to recover the encrypted portion of the set of data.

9. The method of claim 1, wherein the keyed cyclic group process includes multiplying the particular data portion by a function of the key modulo a number.

10. The method of claim 9, wherein the number is $2^{32}$.

11. The method of claim 1, wherein re-applying the keyed cyclic group process is performed during a software compilation or an execution phase of the method.

12. The method of claim 1, wherein the keyed cyclic group process further comprises adding a predetermined value to the set of data.

13. The method of claim 1 further comprising adding a value to the particular data portion prior to applying the keyed cyclic group process.

14. The method of claim 1, wherein the method uses the same or a different key for each of the two applications of the keyed cyclic group process.

15. A method of transforming data using a keyed cyclic group process that uses a particular group as inputs, the method comprising:
    receiving a data designated m, wherein the data is not a member of the group of the keyed cyclic group process;
    storing the data in a first computer readable storage;
    adding a value designated b to the data;
    applying a data transformation to a portion of the stored data using the keyed cyclic group process, wherein a key for the keyed cyclic group process is designated x, a generator element designated g is provided which is a member of the group, and a random number designated r is provided, wherein a transformed keyed data is designated (u, v) and is calculated as $(u, v) = (g^r, g^{xr}*m + g^{xr}*b)$; and
    storing the resulting transformed keyed data in a second computer readable storage.

16. The method of claim 15, wherein the key is derived by a one way process from another key used to recover the encrypted portion of the set of data.

17. The method of claim 15, wherein the keyed cyclic group process uses the ElGamal encryption algorithm.

18. The method of claim 15, wherein the keyed cyclic group process operates on 8, 16, 32 or 64 bits of data.

19. A non-transitory machine readable medium storing a program which when executed by at least one processing unit transforms data with a keyed cyclic group process that uses a particular group as inputs, the program comprising sets of instructions for:
    receiving a set of data, wherein the set of data is not a member of the group of the keyed cyclic group process;
    partitioning the set of data into a plurality of data portions that are members of the group;
    for a particular data portion, applying the keyed cyclic group process by applying a function of a group member, a key, and a first random number to the particular data portion to produce a first transformed data;
    re-applying the keyed cyclic group process to the first transformed data using a second, different random number to obtain a second transformed data; and
    storing the resulting second transformed data as an encrypted portion of the set of data.

20. The non-transitory machine readable medium of claim 19, wherein the particular data portion is designated m, the key for the keyed cyclic group process is designated x, a generator element designated g is provided which is a member of the group, and the first random number is designated r, whereby the first transformed data is designated (u, v) and is calculated as $(u, v) = (g^r, g^{xr}*m)$.

21. The non-transitory machine readable medium of claim 19, wherein the keyed cyclic group process uses the ElGamal encryption algorithm.

22. The non-transitory machine readable medium of claim 19, wherein the keyed cyclic group process operates on 8, 16, 32 or 64 bits of data.

23. The non-transitory machine readable medium of claim 19, wherein the key is derived by a one way process from another key used to recover the encrypted portion of the set of data.

* * * * *